United States Patent [19]
Ishii et al.

[11] Patent Number: 4,579,425
[45] Date of Patent: Apr. 1, 1986

[54] MULTIPLEXABLE LIQUID CRYSTAL DISPLAY WITH REDUCED HYSTERESIS

[75] Inventors: Yutaka Ishii; Shuichi Kozaki; Kenichi Nakagawa, all of Nara, Japan

[73] Assignee: Sharp Kabushiki Kaisha, Osaka, Japan

[21] Appl. No.: 517,450

[22] Filed: Jul. 26, 1983

[30] Foreign Application Priority Data

Jul. 29, 1982 [JP] Japan .................. 57-134564

[51] Int. Cl.⁴ .................................. G02F 1/13
[52] U.S. Cl. .................... 350/346; 350/341; 350/350 R
[58] Field of Search ............ 350/341, 346, 349, 350 R

[56] References Cited

U.S. PATENT DOCUMENTS 3,833,287 9/1974 Taylor et al. .................. 350/349

FOREIGN PATENT DOCUMENTS 55-25006 2/1980 Japan .................. 350/341
55-127520 10/1980 Japan .................. 350/346

OTHER PUBLICATIONS

Ishibashi, T. et al. "On the Multiplexing of the Phase Change Type Color LCD," 1980 *Biennial Display Research Conference of IEEE* (Oct. 1980) pp. 186–188.

Primary Examiner—John K. Corbin
Assistant Examiner—Richard Gallivan
Attorney, Agent, or Firm—Staas & Halsey

[57] ABSTRACT

A liquid crystal display with multiplex capability enhanced by decreasing the hysteresis characteristic of the liquid crystal. The hysteresis characteristic of the crystal is reduced by fixing an angle of twist of the liquid crystal molecules in the range of 270 to 315 degrees, by setting a birefringence ($\Delta N$) of the host molecules at less than or equal to 0.14 and by having a crystal layer thickness (d) of less than or equal to 7 $\mu$m ($\Delta n \cdot d < 1$ $\mu$m).

5 Claims, 9 Drawing Figures

FIG. 1(A)
PRIOR ART

MULTIPLEXABLE LIQUID CRYSTAL DISPLAY WITH REDUCED HYSTERESIS

BACKGROUND OF THE INVENTION

1. Field of the Invention

The present invention relates to a White-Taylor Guest-Host (WT-GH) type liquid crystal display having better threshold voltage characteristics and capable of being easily driven in a multiplex mode.

2. Description of the Prior Art

Guest-Host display devices are generally grouped into those employing polarizers and those not using polarizers. White-Taylor Guest-Host type display devices are representative of the latter group. This type of display device employs a liquid crystal mixture composed of a P-type nematic liquid crystal with a dichroic dye and an optically active material added thereto. The display device utilizes for generating its display both the absorption of light (colored state) due to a twisted orientation of liquid crystal molecules in the absence of an applied electric field (or an electric field less than a threshold electric field) and the transmission of light (non-colored state) due to a homeotropic orientation of liquid crystal molecules in response to an applied electric field (greater than a threshold electric field). FIGS. 1(A), 1(B) and 1(C) illustrate the principles of operation of such a liquid crystal display device. In the absence of an applied electric field, dichroic dye molecules 1 and host liquid crystal molecules 2 are twisted between a pair of glass substrates 3 and 3 as shown in FIG. 1(A). When an electric field is applied by power supply 4 across the transparent electrodes 3, the dichroic dye molecules 1 and the liquid crystal molecules 2 are oriented perpendicularly to the electrodes as shown in FIG. 1(B). Incident light having a wavelength of λ max is substantially absorbed when the molecules are oriented as shown in FIG. 1(A), and is transmitted therethrough when the molecules are oriented as shown in FIG. 1(B). As illustrated in FIG. 1(C), the transmitted light has a spectrum which changes when the applied electric field is the ON and OFF states.

The above display system has widely different characteristics dependent on the type of surface alignment. The surface alignment can be divided mainly into homeotropic and homogeneous alignment types. While the display constrast is higher with the homeotropic alignment, the drive voltage required is lower with the homogeneous alignment. Therefore, the homogeneous alignment is better for a low-voltage multiplex drive.

SUMMARY OF THE INVENTION

It is an object of the present invention to provide a homogeneous-alignment WT-GH liquid crystal display having a high ratio of display contrast ratio and which is capable of being driven in a multiplex mode at a low voltage with a ¼ duty or higher.

A White-Taylor Guest-Host liquid crystal display including a nematic liquid crystal has a positive dielectric anisotropy and an optically active material and a dichroic dye added thereto. A twist angle $\theta$ of a liquid crystal layer between substrates is in a range of $270° \leq \theta \leq 315°$ in the absence of an applied electric field. Host liquid crystal molecules have a refractive index anisotropy $\Delta n$ ($\Delta n = n_e - n_0$, $n_e$ = a refractive index with respect to extraordinary ray and $n_0$ = a refractive index with respect to ordinary ray) of 0.14 or less, and the liquid crystal layer has a thickness d which is 7 μm or less.

DESCRIPTION OF THE PREFERRED EMBODIMENTS

Figure 1A:
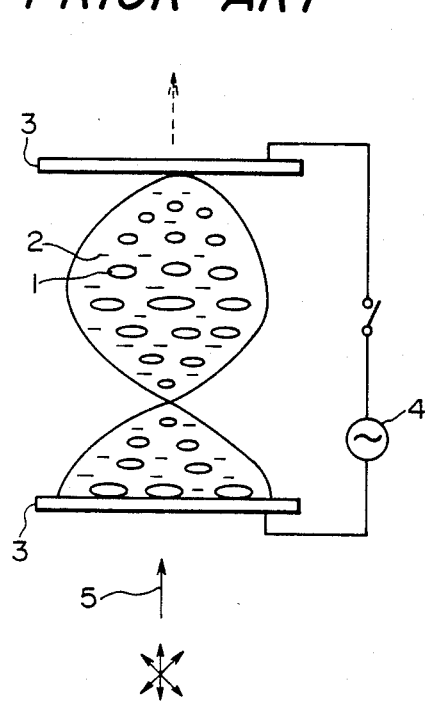
FIGS. 1(A), 1(B) and 1(C) are diagrams of the principles of operation of a WT-GH liquid crystal display having horizontal alignment.
Figure 1B:
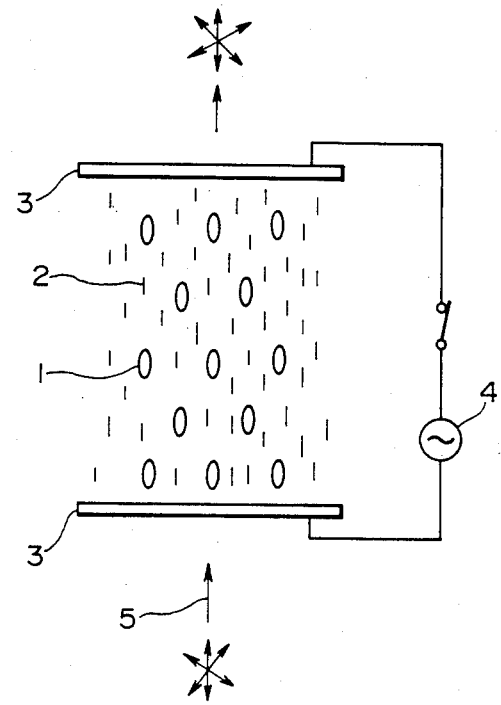
Figure 1C:
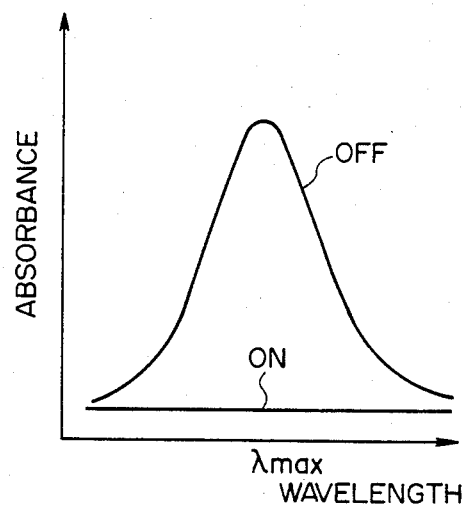

The present invention will now be described in detail with reference to examples thereof. The display characteristics of a WT-GH liquid crystal display of homogeneous alignment is dependent on the twist angle of a liquid crystal layer. Liquid crystal layers having twist angles of 90° and 360° have already been disclosed in Japanese Laid-Open Patent Publications Nos. 56-125723 and 56-83721. However, the liquid crystal layer with the twist angle of 90° exhibits insufficient contrast ratio, and the liquid crystal layer with the twist angle of 360° suffers large hysteresis in its display characteristics. These twist angles fail to provide a multiplex drive with a desired high contrast ratio and a desired relatively high duty ratio. We, therefore, have made studies to find liquid crystal twist angles that are optimum for a multiplex drive having a high duty ratio.

As is well known, the liquid crystal twist angle $\theta$ can be selected at any desired angle by determining the angle between the rubbing directions of the upper and lower substrates (with the angle formed between the rubbing directions being $\xi$) and adjusting the amount of an optically active material added to a nematic liquid crystal. More specifically, assuming that the liquid crystal mixture with the addition of the optically active material has a natural pitch P (the pitch in the case where the twisted orientation remains free from any restraint used between the upper and lower substrates), and the optically active material is added in an amount C, the following relationship is established:

$$P = K/C \quad (K \text{ is a constant}) \tag{1}$$

If the liquid crystal layer has a thickness d and a liquid crystal twist angle $\theta$, then the value of d/P which results in $$\theta = \xi + n\pi (n \text{ is an integer}, -\pi/2 < \xi \leq \pi/2) \tag{2}$$

expressed by $$\xi/2\pi + n/2 - \tfrac{1}{4} < d/P < \xi/2\pi + n/2 + \tfrac{1}{4} \tag{3}$$

To attain the liquid crystal twist angle as expressed by equation 2, the amount of the optically active material added should be adjusted on the basis of the equations 1 and 3 as follows:

$$K/d(\xi/2\pi + n/2 - \tfrac{1}{4}) < C < K/d(\xi/2\pi + n/2 + \tfrac{1}{4}) \tag{4}$$

In matching P with d, the added amount C is derived from the equation 4 as follows:

$$C = K/d(\xi/2\pi + n/2) \quad (5)$$

Various values for the twist angle $\theta$ were established based on equation 5. The host liquid crystal used was a PCH liquid crystal ZLI-1694 (manufactured by Merck, having a birefringence $\Delta n = 0.14$, where $\Delta n = n_e - n_0$, $n_e$ is a refractive index with respect to extraordinary ray and $n_0$ is a refractive index with respect to ordinary ray), the optically active material used was a chiral nematic material CB-15 (manufactured by BDH), and the dye used was anthraquinone dye M137 (manufactured by Mitsui Toatsu Chemicals, Inc.). The glass substrates were coated with films of a macromolecular alignment agent PIX #5400 (manufactured by Hitachi Kasei Co., Ltd.).

Figure 2:
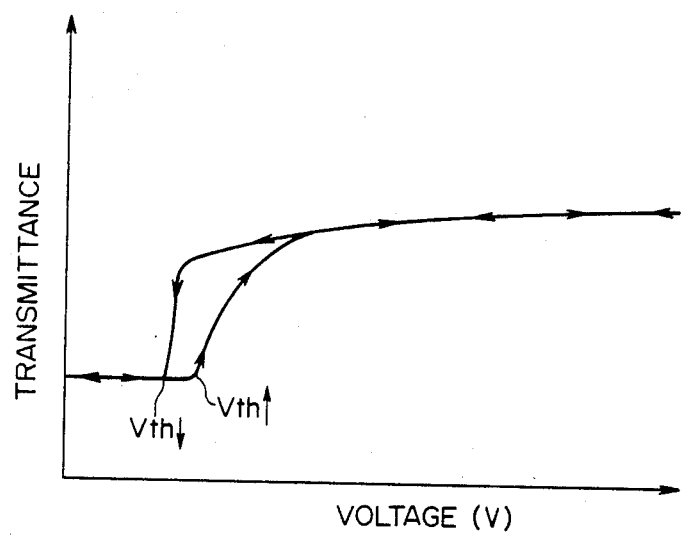
FIG. 2 is a graph of an applied voltage plotted against a transmittance of the WT-GH liquid crystal display having horizontal alignment.
Figure 3:
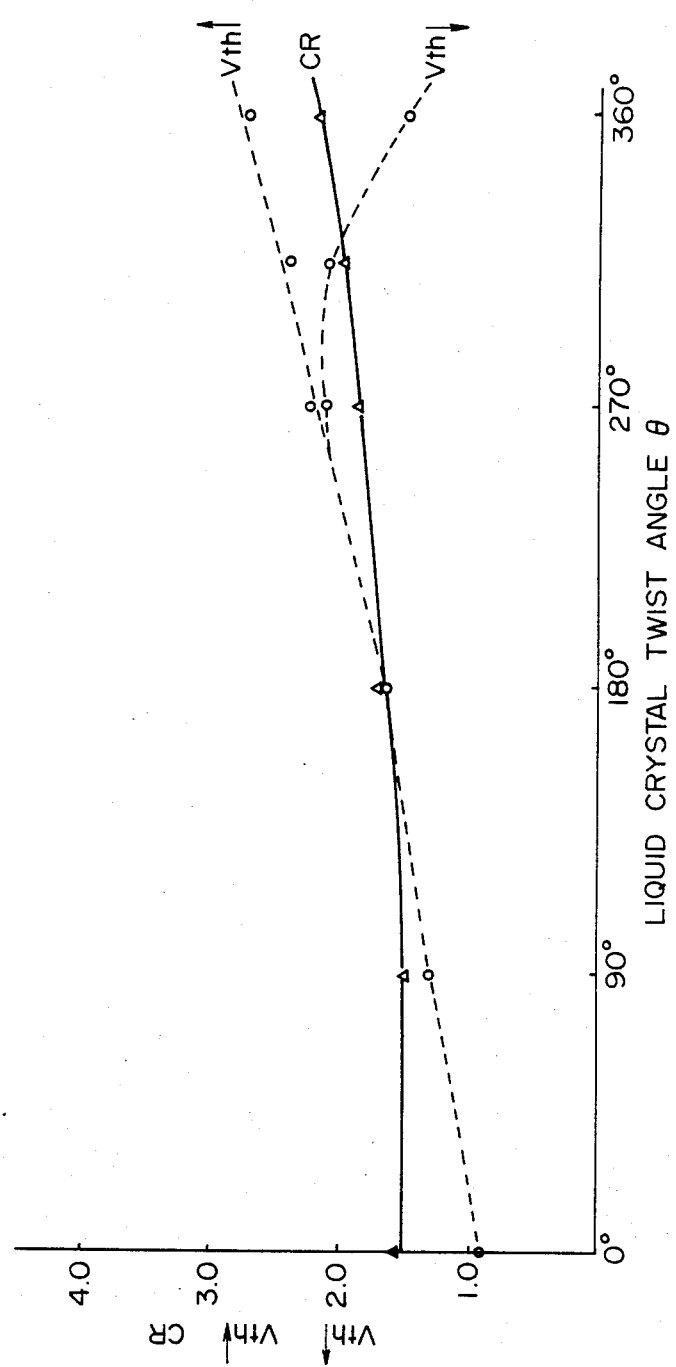
FIG. 3 is a graph of the relationships of Vth, CR and a liquid crystal twist angle $\theta$.

The WT-GH liquid display device having homogeneous alignment constructed as described above generally has a hysteresis in the relationship between an applied voltage and a transmittance as shown in FIG. 2. To illustrate this phenomenon clearly, a threshold voltage of Vth ↑ defined at the time of a voltage increase (0 V→20 V at a rate of 0.1 V/sec.), a threshold voltage of Vth ↓ is defined at the time of a voltage reduction (20 V→0 V at a rate 0.1 V/sec.), and the ratio of transmittance at 0 V and 4 V at the time of the voltage drop is defined as a contrast ratio CR = (Ts (4 V)/Ts (0 V)). The relationships between $\theta$, and Vth ↑, Vth ↓, and CR are shown in FIG. 3, where d = 10 $\mu$m, $\lambda$32 640 nm, and the dye concentration = 1 wt %. FIG. 3 indicates that as the twist angle $\theta$ increases, the contrast ratio CR and the threshold voltage Vth ↑ increases while the threshold voltage Vth ↓ decreases. For a multiplex drive mode, it is preferable that the twist angle $\theta$ be increased from the standpoint of the best contrast ratio CR. However, if the twist angle $\theta$ is too large, then the difference between the threshold voltages Vth ↑ and Vth ↓ is increased, resulting in a smaller operating margin and higher hysteresis. Therefore, the liquid crystal twist angle $\theta$ should be determined by also taking into account the duty ratio. This will be described in greater detail. Let an effective-value voltage at an unselected or OFF point be $V_{off}$(rms), an effective-value voltage at a selected or ON point be $V_{on}$ (rms), and the number of scanning lines N, then the relationships can be expressed by the following equation in an optimized amplitude selecting method:

$$\frac{V_{on}(\text{rms})}{V_{off}(\text{rms})} = \sqrt{\frac{\sqrt{N}+1}{\sqrt{N}-1}} \quad (6)$$

With the voltage $V_{off}$ (rms) = Vth ↓ and the voltage $V_{on}$ (rms) = Vth ↑, the maximum number of scanning lines Nmax for the characteristics illustrated in FIG. 3 can be determined from equation 6. The following are the results of calculation:

| $\theta$ | 0° | 90° | 180° | 270° | 315° | 340° | 360° |
|---|---|---|---|---|---|---|---|
| Vth ↑ /Vth ↓ | 1 | 1 | 1 | 1.07 | 1.14 | 1.44 | 1.83 |
| $N_{max}$ | ∞ | ∞ | ∞ | 219 | 58 | 8 | 3 |

Where pitch P and thickness d are mismatched with each other, the value of Vth ↑ /Vth ↓ has the change of about 30% in the above table of $\theta \geq 270°$. With the number $N_{max}$ in this case being indicated by $N'_{max}$, the relationship between the number $N'_{max}$ and the twist angle $\theta$ is as follows:

| $\theta$ | 0° | 90° | 180° | 270° | 315° | 340° | 360° |
|---|---|---|---|---|---|---|---|
| $N'_{max}$ | ∞ | ∞ | ∞ | 9 | 7 | 3 | 2 |

A study of the above tables reveals that as the twist angle $\theta$ is increased (because the value of Vth ↑ /Vth ↓ is increased), the maximum numbers $N_{max}$ and $N'_{max}$ of scanning lines are reduced. For a multiplex drive with ¼ duty ($N'_{max} \approx 4$), the twist angle should be set in the range $270° \leq \theta \leq 315°$ when the above results and desired high contrast ratio CR are taken into account. It has been confirmed by other tests that the above-discussed angle settings and results remain unchanged for any kind of host liquid crystals, any kind of dichroic dye, and any kind of alignment agent for the homogeneous alignment.

Figure 4A:
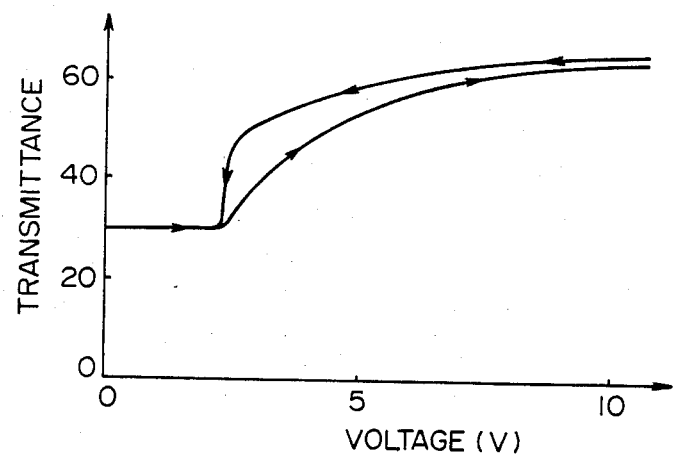
FIGS. 4(A), 4(B) and 4(C) are graphs of display characteristics plotted when the twist angle is 270°.
Figure 4B:
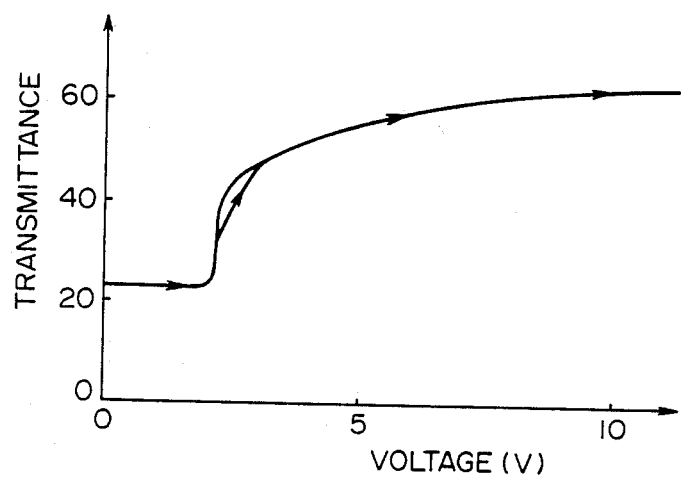
Figure 4C:
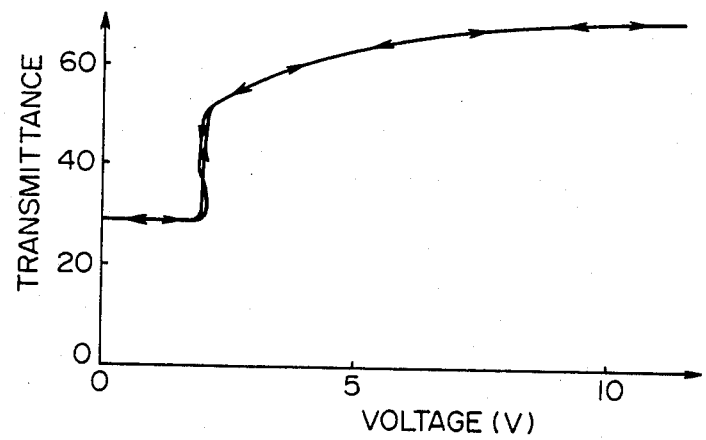
Figure 5:
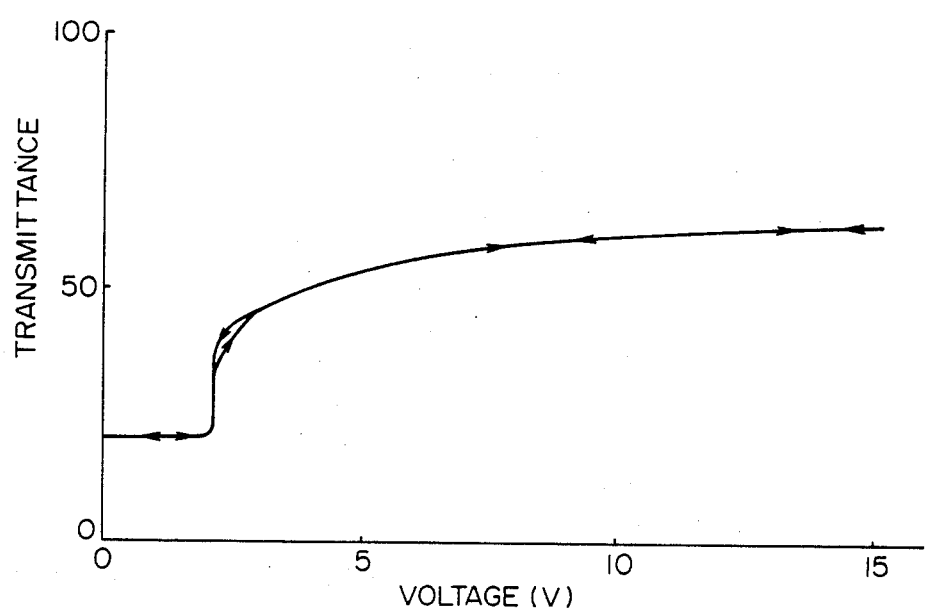
FIG. 5 is a graph of display characteristics plotted when the twist angle $\theta$ is 270° and $\Delta n = 0.11$.

The effect of the thickness of the cell will now be described. Liquid crystal cells were constructed and tested using the foregoing Guest-Host liquid crystal materials with liquid crystal layers having a twist angle of 270° and thicknesses of 10 $\mu$m, 7 $\mu$m, and 5.6 $\mu$m, and the display characteristics of such liquid crystal cells were studied, the results being illustrated in FIGS. 4(A)–4(C), respectively. The optically active material was added in amounts matching the respective cell thicknesses. In FIG. 4(A), the display suffers a large hysteresis characteristic at d = 10 $\mu$m. By thinning the liquid crystal layer to d = 7 $\mu$m (FIG. 4(B)) and to d = 5.6 $\mu$m (FIG. 4(C)), the hysteresis was substantially eliminated. A further reduction in the cell thickness d results in a sharp rise of the transmittance in the vicinity of the threshold voltage and also in a reduction in the threshold voltage Vth. The reduced cell thickness is thus effective in improving the multiplex characteristics, and also in improving the response characteristics and contrast. Therefore, by selecting the cell thickness to be 7 $\mu$m or smaller, a display device can be provided having a relatively high duty ratio and capable of being driven in a multiplex mode. The display contrast can further be improved by using a material having a refractive index anisotropy of $\Delta n < 0.14 (\Delta n \cdot d < 1.0 \mu m)$. As an example, FIG. 5 shows the display characteristics (d = 7 $\mu$m) of a PCH liquid crystal material with $\Delta n = 0.11$. Comparison between this material and the foregoing material having $\Delta n < 0.14$ for the contrast ratio CR = (Ts(4V)/Ts (0V)) shows that CR = 2.1 for the material of $\Delta n = 0.14$, while CR = 2.4 for the material of $\Delta n = 0.11$.

For the liquid crystal cell having its thickness in the foregoing range, insufficient optically rotatory dispersion would be caused by liquid crystal materials of $\Delta n > 0.15$. Light absorption would, therefore, be reduced, and the contrast ratio would be impaired to a large extent. Therefore, it is necessary to select the value of $\Delta n$ to be $\Delta n \leq 0.14$ for the liquid crystal cell with d ≤ 7 $\mu$m.

As described above, the homogeneous-alignment WT-GH display with $270° \leq \theta \leq 315°$, $\Delta n \leq 0.14$ and d ≤ 7 $\mu$m, that is to say $\Delta n \cdot d < 1 \mu m$, has an improved contrast and response, and is capable of being driven in a multiplex mode with ¼ duty cycle or more. Accordingly, the arrangement of the invention leads to the establishment of a quite effective color display technique.

What is claimed is:

1. A liquid crystal display, comprising:
   first and second substrates; and
   a liquid crystal layer, between said first and second substrates, having a twist angle in a range of 270 to 315 degrees in the absence of an applied electric field, having host liquid crystal molecules with a birefringence ($\Delta n$) less than or equal to 0.14 and having a thickness (d) less than or equal to 7 $\mu$m.

2. A liquid crystal display as recited in claim 1, wherein said liquid crystal has a positive dielectric anisotropy and has added thereto an optically active material and a dichroic dye.

3. A liquid crystal display, comprising:
   first and second substrates; and
   a field effect mode liquid crystal layer between said first and second substrates having a twist angle in the range of 270 to 315 degrees in the absence of an applied electric field, and said liquid crystal layer having a thickness (d) of less than or equal to 7 $\mu$m.

4. A liquid crystal display, comprising:
   first and second substrates; and
   a field effect mode liquid crystal layer between said first and second substrates having a twist angle in the range of 270 to 315 degrees in the absence of an applied electric field, and said liquid crystal layer having host molecules with a birefringence ($\Delta n$) less than or equal to 0.14.

5. A liquid crystal display, comprising:
   first and second substrates; and
   a field effect mode liquid crystal layer between said first and second substrates having a twist angle in the range of 270 to 315 degrees in the absence of an applied electric field, and said liquid crystal layer having $\Delta n \cdot d$ less than 1.0 $\mu$m where $\Delta n$ indicates a birefringence of host molecules and d indicates thickness.

* * * * *

UNITED STATES PATENT AND TRADEMARK OFFICE
CERTIFICATE OF CORRECTION

PATENT NO. : 4,579,425
DATED : April 1, 1986
INVENTOR(S) : Yutaka Ishii et al.

It is certified that error appears in the above-identified patent and that said Letters Patent is hereby corrected as shown below:

In the Abstract, line 6, "($\Delta$ N)" should read -- ($\Delta$ n) --.

Column 3, line 30, "$\lambda$32 640 nm," should read -- $\lambda$ = 640 nm, --.

Column 4, line 29, "4(A-" should resd -- 4(A)- --.

line 30, delete ")'.

Signed and Sealed this

Sixteenth Day of September 1986

[SEAL]

*Attest:*

DONALD J. QUIGG

*Attesting Officer*     *Commissioner of Patents and Trademarks*